United States Patent [19]
Millstein

[11] Patent Number: 5,821,941
[45] Date of Patent: Oct. 13, 1998

[54] GEOMETRIC CONSTRAINTS BETWEEN RELATED ELEMENTS IN DIFFERENT 2-DIMENSIONAL VIEWS

[75] Inventor: Jerry Millstein, Ojai, Calif.

[73] Assignee: Dassault Systemes of America, Corp., Burbank, Calif.

[21] Appl. No.: 700,124

[22] Filed: Aug. 20, 1996

Related U.S. Application Data

[63] Continuation of Ser. No. 289,605, Aug. 12, 1994, abandoned.

[51] Int. Cl.$^6$ .................................................. G06T 15/00
[52] U.S. Cl. ...................... 345/420; 345/433; 364/468.09
[58] Field of Search ..................................... 345/419, 420, 345/427, 418–19, 433–43; 364/468.04, 468.09, 468.1, 474.24, 578

[56] References Cited

U.S. PATENT DOCUMENTS

| | | | |
|---|---|---|---|
| 4,785,399 | 11/1988 | Evans et al. | 364/300 |
| 4,845,643 | 7/1989 | Clapp | 364/518 |
| 4,855,939 | 8/1989 | Fitzgerald, Jr. et al. | 364/522 |
| 4,993,865 | 2/1991 | Yamamoto et al. | 364/518 |
| 5,010,502 | 4/1991 | Diebel et al. | 364/522 |
| 5,123,087 | 6/1992 | Newell et al. | 395/155 |
| 5,138,697 | 8/1992 | Yamamoto et al. | 395/120 |
| 5,198,990 | 3/1993 | Farzan et al. | 364/560 |
| 5,251,268 | 10/1993 | Colley et al. | 382/14 |
| 5,297,241 | 3/1994 | Hirr, Jr. et al. | 395/127 |
| 5,299,307 | 3/1994 | Young | 395/161 |
| 5,303,337 | 4/1994 | Ishida | 345/419 |
| 5,353,395 | 10/1994 | Tokumasu et al. | 395/141 |
| 5,371,845 | 12/1994 | Newell et al. | 395/155 |
| 5,377,313 | 12/1994 | Scheibl | 395/122 |
| 5,390,294 | 2/1995 | Takeuchi | 395/155 |
| 5,396,565 | 3/1995 | Asogawa | 382/14 |
| 5,412,762 | 5/1995 | Kondo | 395/120 |
| 5,425,109 | 6/1995 | Saga et al. | 382/187 |
| 5,461,709 | 10/1995 | Brown | 395/155 |
| 5,463,722 | 10/1995 | Venolia | 395/133 |
| 5,465,324 | 11/1995 | Lee et al. | 395/133 |
| 5,490,241 | 3/1996 | Mallgren et al. | 395/140 |

OTHER PUBLICATIONS

Luzadder W., "Fundamentals of Engineering Drawing," pp. 85–86, 1981.

Clarke C., "Bravo New World–Schlumberger AG's CAD–CAM System" CADCAM, v11, p. 17(3), Nov. 1992.

Schwartz D., "Modeling Made Easy: HP's ME30 Software Allows Leviton Manufacturing to get Over the Hump," HP Professional, v8, p. 24(2), Apr. 1994.

(List continued on next page.)

*Primary Examiner*—Rudolph J. Buchel, Jr.
*Attorney, Agent, or Firm*—Blakely, Sokoloff, Taylor & Zafman LLP

[57] ABSTRACT

Projection lines from related elements are used to connect the related elements in aligned views and points on an auxiliary foldline are used to connect projection lines from related elements in two offset non-aligned views. 2-dimensional constraints are automatically generated between the related elements and the respective projection lines, and between each point on the auxiliary foldline and the two respective projection lines through that point, to represent a corresponding 3-dimensional constraint between the related elements. The 3-dimension constraints may include "coplanar" (two lines representing a common plane normal to the planes of two views), "line-on" (a line represented by a point in one view is on a plane represented by a line in another view), and "tangent plane" (a plane represented by a line in one view is tangent to a cylinder represented by a circle in another view).

32 Claims, 3 Drawing Sheets

OTHER PUBLICATIONS

Kanai, et al "Generation of Free–From surface Models by Understanding Geometric and Topological Constraints on Rough Sketches" *Systems Engineering, 1992, International Conference*, pp. 246–249.

H. Samet, "The Design and Analysis of Spatial Data Structures", Addison–Wesley Publishing Company Inc. Reading, MA. pp. 1–149.

"Declaration of Christopher C. Romes". Serial No. 08/289,604, Filed Aug. 12, 1994. Automatic Identification of Geometric Relationships Between Elements of a Computer–Generated Drawing.

Newton, Tips and Technique, Apple Computer Inc., 1993.

Newton, "Message Pad 100 Setup and Handwriting Guide", Apple Computer, Inc. 1994.

Newton, "Message Pad Handbook", Apple Computer, Inc. 1993.

GEOMETRIC CONSTRAINTS BETWEEN RELATED ELEMENTS IN DIFFERENT 2-DIMENSIONAL VIEWS

This is a continuation of application Ser. No. 08/289.605, filed Aug. 12, 1994, now abandoned.

TECHNICAL FIELD

The present invention relates generally to the generation and display of computerized drawings and more particularly to a computerized system for processing 3-dimensional geometric relationships (such as "coplanar") as a set of 2-dimensional constraints (such as "colinear") between elements in a single drawing comprising two or more connected 2-dimensional views.

BACKGROUND ART

In conventional 2-dimensional computer assisted drafting, the individual elements (such as line segments, circles, and arcs) of a drawing are typically specified as vector-based data. For example, in Cartesian coordinates, a point is represented by (x,y), with x representing the horizontal distance from a vertical y-axis, and y representing the vertical distance from a horizontal x-axis. In a similar fashion, a circle can be specified as a center point ($x_c, y_c$) and an associated radius (r), and a line segment can be specified as two points ($x_a, y_a$), ($x_b, y_b$) or as a point ($x_c, y_c$), an angle ($\Theta$) and a length (d). Because dimensional data is subject to round-off errors and/or measurement errors, and because constraint information is not subject to such errors and is invariant during scaling and other manipulation of the image, 2-dimensional geometrical constraints (such as coincident with, terminated by or parallel to) have been used to supplement dimensional information (position, length, radius, angle, etc) to specify a vector based image.

Software is commercially available to vary certain distances, angles, or other parameters defining various aspects of a single 2-dimensional image while maintaining specified 2-dimensional geometrical constraints between various elements of that image.

A 3-dimensional object can be conventionally represented as a set of 2-dimensional images ("views"), each corresponding to a projection of the object onto a different projection plane. If the projection plane is orthogonal to one of the three primary axes of the object, the view is "orthogonal" and shows the object in plan, front, or profile. If the projection plane is parallel to a planar surface, but not orthogonal to any of the primary axis, the view is a "true view" and shows the planar surface without any foreshortening. If the projection plane intersects all three axes at the same angle, the view is an "isometric" view with equal foreshortening along each of the three primary axes. Each view is typically provided with its own scale and coordinate system, which provides means for projecting elements (points and lines) in a first view as respective construction lines and construction surfaces containing the corresponding elements in a second view. In a similar fashion, construction lines and construction surfaces projected from,related elements in two views can be used to locate corresponding elements in a third view. However, once each view has been constructed, the known prior art 2-dimensional drafting systems (such as Professional CADAM Version 3 Release 4) store the individual elements of each view without any specific indication of any geometrical relationship with any other elements in any of the other views, and any element already defined in the current view is edited without regard for any corresponding elements in other views that may have been used to construct the element being modified, or that may otherwise be geometrically related to the modified element.

Accordingly there is a need for method and apparatus for automatically converting geometrical constraints between different views of the same 3-dimensional object into 2-dimensional constraints between elements in a single drawing that can be readily modified while maintaining any underlying 3-dimensional geometrical relationships between the original elements in the original views.

DISCLOSURE OF INVENTION

It is an overall object of the invention to simplify subsequent parametric modification of different views of a 3-dimensional object by using a set of 2-dimensional constraints to identify a 3-dimensional constraint between related elements appearing in different views.

It is another overall object of the present invention to provide a computerized method and/or associated apparatus for facilitating the identification of geometrical constraints between elements appearing in different views of a 3-dimensional object, particularly when the views are not aligned to each other (i.e., the projection vector 5 connecting the two views are not parallel).

It is an object of a more specific aspect of the invention to supplement the conventional construction lines parallel to the projection axes and the conventional foldlines perpendicular to the projection axes with an auxiliary foldline between two non-aligned views to thereby define points and lines that may be constrained in 2-dimensions to reflect an underlying 3-dimensional constraint between elements appearing in the two non-aligned views.

It is an object of another specific aspect of the invention to automatically generate a single composite drawing incorporating a plurality of designated views of a three-dimensional object plus constructed connecting elements, and to automatically generate for each identified 3-dimensional constraint between the original elements, a set of 2-dimensional constraints between the original elements and the constructed elements.

In accordance with the present invention, the foregoing and other related objects are accomplished by a novel computerized drafting system which automatically constructs connecting elements to connect related elements in different views, and automatically generates 2-dimensional constraints between the related elements and the connecting elements to reflect a 3-dimensional constraint between the related elements.

More specifically, a preferred embodiment of the invention uses projection lines from related elements to connect the related elements in aligned views and points on an auxiliary foldline to connect projection lines from related elements in two non-aligned views, and automatically generates 2-dimensional constraints between the related elements and the respective projection lines, and between each point on the auxiliary foldline and the two respective projection lines through that point, to represent a corresponding 3-dimensional constraint between the related elements.

BEST MODE FOR CARRYING OUT THE INVENTION

Figure 1:
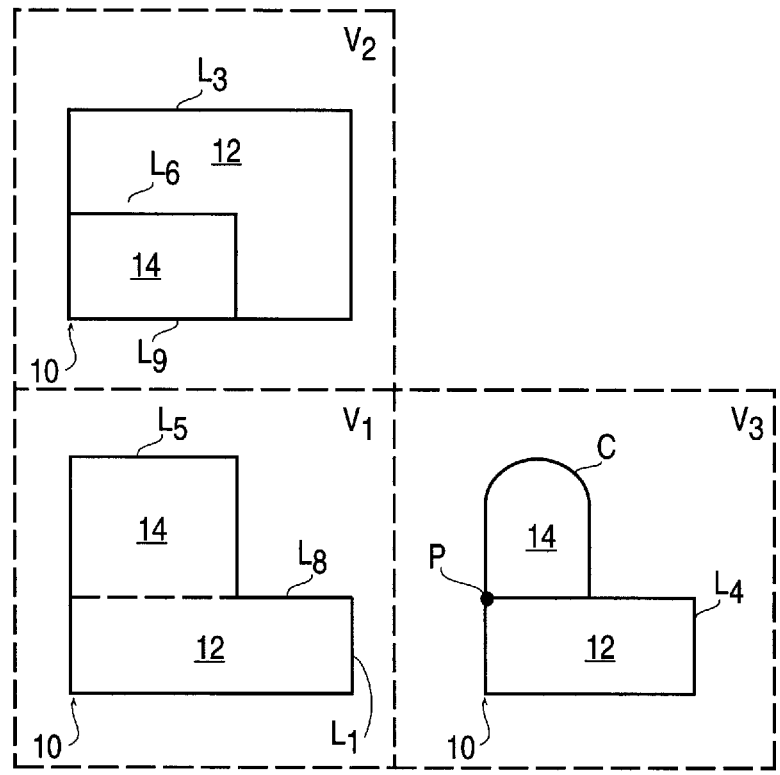
FIG. 1 is a single drawing incorporating three conventional views of a 3-dimensional object.

FIG. 1 shows a conventional 2-dimensional orthographic drawing comprising three conventional orthographic views (plan view $V_1$, top view $V_2$ and side view $V_3$) a 3-dimensional object 10 having a rectangular base 12 supporting a barrel-shaped housing 14.

Figure 2:
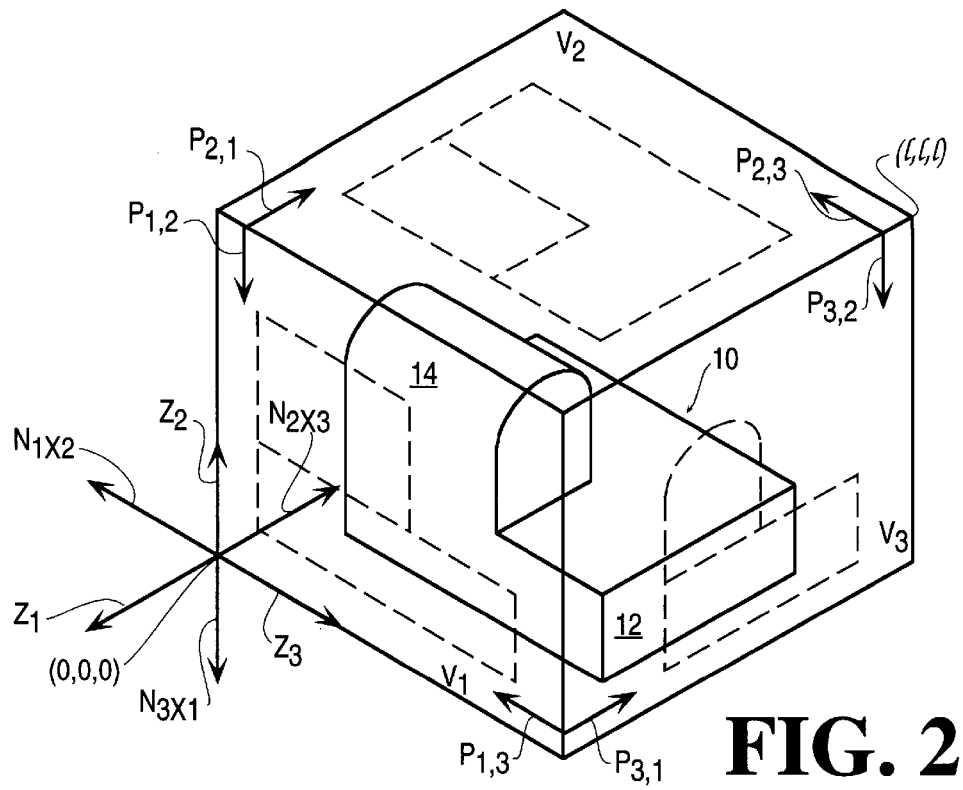
FIG. 2 is an isometric drawing showing how the object of FIG. 1 is projected in conventional fashion onto three orthogonal surfaces corresponding to the three views of FIG. 1.
Figure 4:
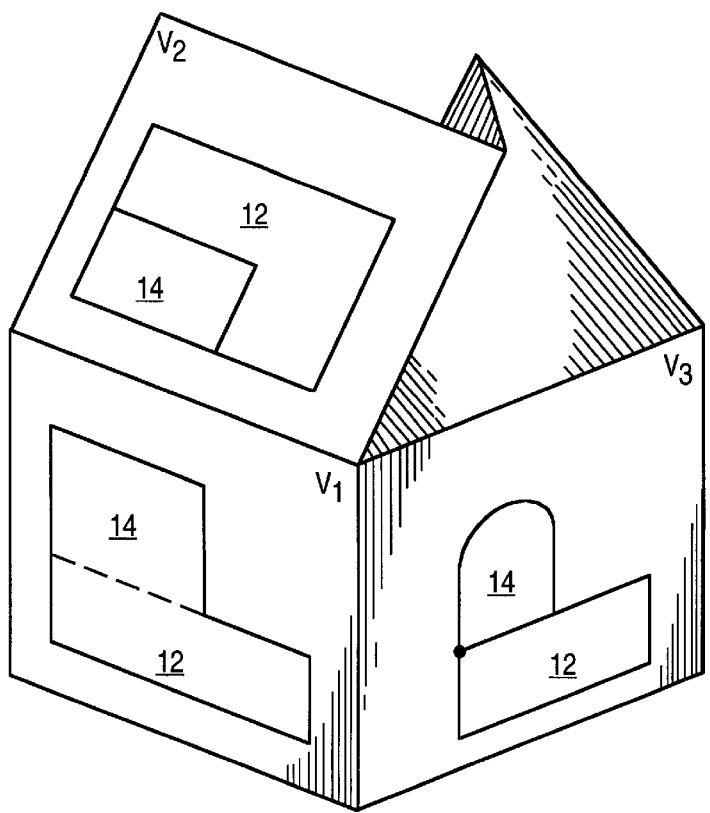
FIG. 4 is an isometric drawing showing the relationship of the auxiliary foldline of FIG. 3 to the three orthogonal surfaces of FIG. 2.

As shown in FIG. 2, $Z_1$ is the vector that is normal (perpendicular) to the plane of the plan view $V_1$. Similarly, $Z_2$ is the vector that is normal (perpendicular) to the plane of the top view $V_2$ and vector $Z_3$ is the normal vector for side view $V_3$.

Vector $N_{1\times2}$ is the cross product of $Z_1$ and $Z_2$ and is therefore perpendicular to the plane containing both $Z_1$ and $Z_2$. Similarly vector $N_{2\times3}$ is the cross product of $Z_2$ and $Z_3$ and vector $N_{3\times1}$ is the cross product of $Z_3$ and $Z_1$. In orthographic projection, vector $N_{1\times2}$ will be perpendicular to the plane of side view $V_3$ and parallel to vector $Z_3$, vector $N_{2\times3}$ will be perpendicular to the plane of plan view $V_1$ and parallel to vector $Z_1$, and vector $N_{3\times1}$ will be perpendicular to the plane of front view $V_2$ and parallel to vector $Z_2$.

Vector $P_{2,1}$ is in the plane of view $V_1$ and is perpendicular to the representation of $N_{1\times2}$ in view $V_2$; it represents the projection orientation of the elements of view $V_2$ onto the plane of view $V_1$. Vector $P_{1,2}$ is in the plane of view $V_2$ and is perpendicular to the representation of $N_{1\times2}$ in view $V_1$; it represents the projection orientation of the elements of view $V_1$ onto the plane of view $V_2$. Similarly, vectors $P_{3,2}$ and $P_{2,3}$ are in planes of views $V_3$ and $V_2$ perpendicular to the representation of $N_{2\times3}$ and represent the projection of view $V_3$ onto view $V_2$ and vice versa: vectors $P_{3,1}$ and $P_{1,3}$ are in planes of views $V_1$ and $V_3$ perpendicular to the representation of $N_{3\times1}$ and represent the projection of view $V_3$ onto view $V_1$ and vice versa.

Figure 3:
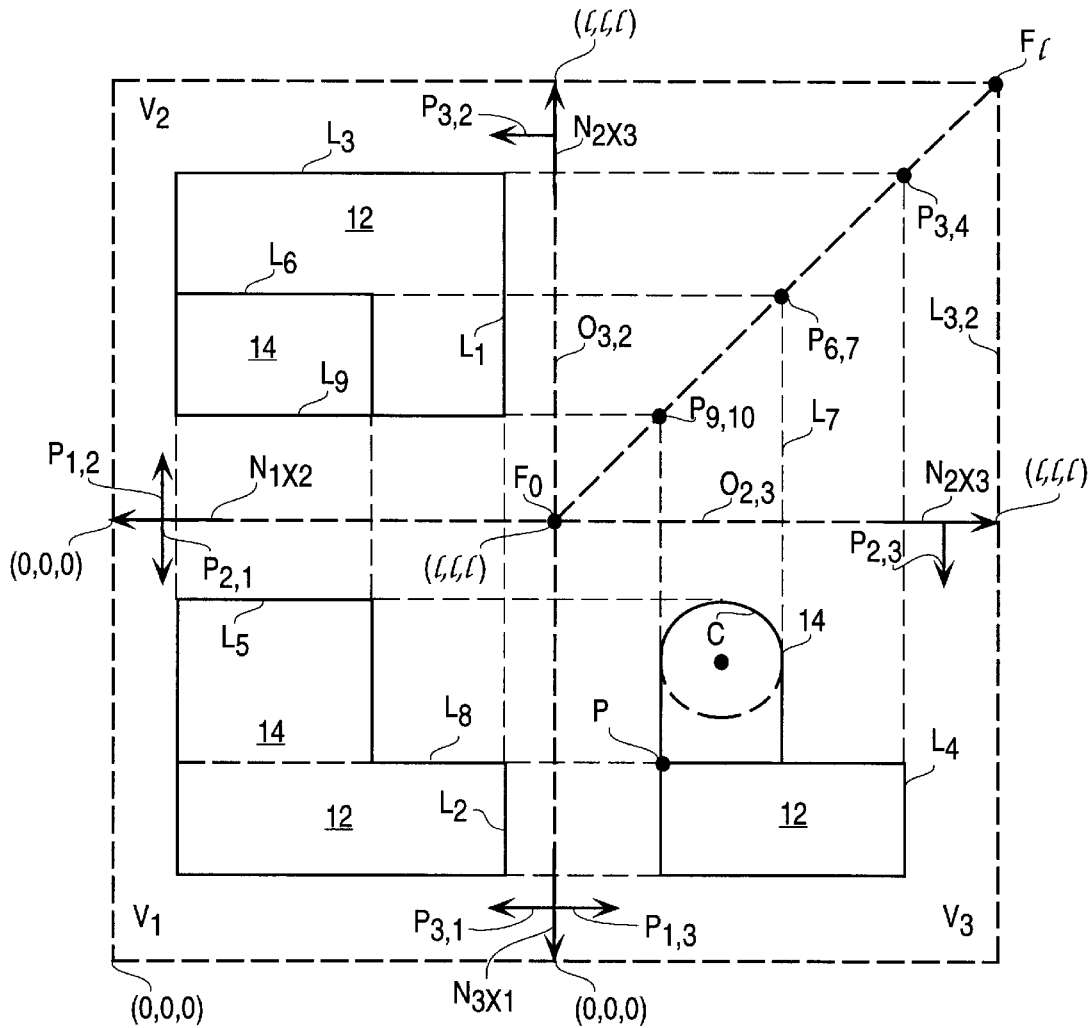
FIG. 3 shows the drawing of FIG. 1 modified in accordance with the present invention, wherein certain related elements have been connected with projection lines and with connecting points on an auxiliary foldline.

Reference should now be made to FIG. 3, which generally corresponds to FIG. 1. However, it will be noted that the projection vectors $P_{3,2}$ and $P_{2,3}$ connecting two of the views, namely top view $V_2$ and side view $V_3$ are not aligned, but are offset from each other by 90°. In accordance with the invention, an auxiliary foldline $F_O$–$F_I$ has therefore been added to connect views $V_2$ and $V_3$, which bisects the angle between the two projection vectors $P_{3,2}$ and $P_{2,3}$. Note that if the projection vectors connecting two views are aligned (which is the case for views $V_1$ and $V_2$ or for $V_1$ and $V_3$), then no auxiliary foldline is needed between those views. As will be apparent to those skilled in the art, the auxiliary foldline $F_O$–$F_I$ and the various projection vectors $P_{i,j}$ are "construction" elements that would be automatically deleted or hidden from view in the finished drawing.

In a preferred embodiment, the auxiliary foldline is defined by a software routine which automatically uses 2 starting points in the underlying 3-dimensional space to construct 2 fold points that define the auxiliary foldline.

For convenience, the first starting point may be (0,0,0) which is at the 3-dimensional absolute origin (see FIG. 2), and which projects into the lower left corner of each of the three orthographic views. The second starting point may be (1,1,1) which is at the far corner of the 3-dimensional space at an arbitrary distance l along each axis from the origin, and which projects into the upper right corner of each of the three orthographic views.

As shown in FIG. 3, the projection of each starting point ((0,0,0), (1,1,1) at the lower left and upper right of each of the two offset views ($V_2$, $V_3$) is then used to construct a respective pair of construction lines $O_{2,3}$ $L_{2,3}$, $O_{3,2}$ $L_{3,2}$ parallel to the respective projection vectors $P_{3,2}$, $P_{2,3}$ relating its orientation to the other view. The intersection of the construction lines $O_{2,3}$, $O_{3,2}$ originating at the respective projections of the first starting point (0,0,0) defines the first fold point $F_0$ and the intersection of the construction lines $L_{2,3}$, $L_{3,2}$ originating at the respective projections of the second starting point (1,1,1) defines the second fold point $F_I$.

It will be apparent from the foregoing that the starting points should not both lie in a plane parallel to the plane of either view, but their respective positions may otherwise be arbitrary.

Still referring to FIG. 3, examples will now be described as to how various 3-dimensional constraints can be automatically represented as a set of 2-dimensional constraints.

A "coplanar" constraint specifies that the plane represented by a line in one view is coplanar with the plane represented by a second line in another view. For example, the right side of the base 12 is represented by the vertical line $L_1$ at the far right of view $V_1$ and by the vertical line $L_2$ at the far right of view $V_2$. Another example of the coplanar constraint is the horizontal line $L_3$ at the top of view $V_2$ and the vertical line $L_4$ at the far right of view $V_3$, which are both on the rear surface of base 12.

If the projection vectors of the two views are parallel, only two 2-dimensional constraints are required to identify lines $L_1$ and $L_2$ as coplanar, as shown in views $V_1$ and $V_2$ of FIG. 3:

1) $L_1$ is colinear with $L_2$
2) One of the lines (eg, $L_1$) is parallel to one of the two parallel projection vectors (eg, $P_{1,2}$) connecting the two views.

On the other hand, if the 2 views are offset, then the views are connected by the auxiliary foldline $F_O$–$F_I$ and five 2-dimensional constraints are automatically generated to identify lines $L_3$ and $L_4$ in views $V_2$ and $V_3$ as coplanar.

1) Point $P_{3,4}$ lies on the auxiliary foldline $F_O$–$F_I$.
2) Point $P_{3,4}$ lies on line $L_3$
3) Point $P_{3,4}$ lies on line $L_4$
4) Line $L_3$ in view $V_2$ is parallel to the projection vector $P_{3,2}$
5) Line $L_4$ in view $V_3$ is parallel to the projection vector $P_{2,3}$.

Note that point $P_{3,4}$ is a "construction point" that is automatically generated at the intersection of lines $L_3$ and $L_4$ and does not appear in the finished drawing.

A "plane-tangent" constraint specifies that the cylinder represented by a circle in one view is tangent to the plane represented by a line in another view. If the projection vectors of the 2 views are parallel, only two 2-dimensional constraints are required to identify the 3-dimensional "plane-tangent" constraint between circle C in view $V_3$ and line $L_5$ in view $V_1$:

1) Circle C is tangent to line $L_5$.
2) Line $L_5$ is parallel to one of the two parallel projection vectors (eg $P_{1,3}$) connecting the two views. However, if the 2 views are offset, then the views are connected by the auxiliary foldline $F_O$–$F_I$, and six 2-dimensional constraints are required to identify the 3-dimensional "plane-tangent" between circle C in view $V_3$ and line $L_6$:

1) Point $P_{6,7}$ lies on auxiliary foldline $F_O\text{-}F_I$.
2) Point $P_{6,7}$ lies on line $L_6$.
3) Point $P_{6,7}$ lies on line $L_7$.
4) Line $L_6$ is parallel to the projection vector $P_{3,2}$
5) Line $L_7$ is tangent to circle C.
6) Line $L_7$ is parallel to the projection vector $P_{2,3}$ Note that point $P_{6,7}$ is a "construction point" that is automatically generated at the intersection of lines $L_6$ and the auxiliary foldline $F_O\text{-}F_I$, and that line $L_7$ is a "construction line" that is automatically generated through point $P_{6,7}$ that is parallel to the projection vector $P_{2,3}$.

A line on or point-on plane ("line-on") constraint specifies that the line represented by a point in one view lies on the plane represented by a line in another view. If the relevant projection vectors are parallel, then only two 2-dimensional constraints are required to identify the 3-dimensional "line-on" constraint exemplified by point P of view $V_3$ and line $L_8$ of view $V_1$:

1) Point P lies on line $L_8$.
2) Line $L_8$ is parallel to one of the two parallel projection vectors (eg $P_{1,3}$) connecting the two views.

On the other hand, since views $V_2$ and $V_3$ in FIG. 3 are "offset" (their respective projection vectors are not parallel), six 2-dimensional constraints are required to identify the 3-dimensional "line-on" constraint exemplified by point P of view $V_3$ and line $L_9$ of view $V_2$:

1) Point $P_{9,10}$ lies on auxiliary foldline $F_O\text{-}F_I$.
2) Point $P_{9,10}$ lies on line $L_9$.
3) Point $P_{9,10}$ lies on line $L_{10}$.
4) Point P lies on line $L_{10}$.
5) Line $L_9$ is parallel to projection vector $P_{3,2}$.
6) Line $L_{10}$ is parallel to projection vector $P_{2,3}$.

Note that point $P_{9,10}$ is a "construction point" that is automatically generated at the intersection of lines $L_9$ and the auxiliary foldline $F_O\text{-}F_I$, and that line $L_{10}$ is a "construction line" that is automatically generated through point $P_{9,10}$ that is parallel to the projection vector $P_{2,3}$.

In a presently preferred embodiment, two corresponding elements in two views may be manually selected for automatic generation of the corresponding constraints. For example, if two lines are selected, the system automatically attempts to generate the various construction elements and 2-dimensional constraints required to identify a 3-dimensional coplanar constraint between the respective planes represented by the two lines. However, it should be evident to one skilled in the art that alternate embodiments are possible in which the user merely chooses constraints and/or types of elements of interest and the system automatically uses all elements in two or more views (or a particular set or category of elements of interest) to construct corresponding projection lines from all those elements and any associated intersecting points on any auxiliary foldline, using the methodology disclosed in the commonly assigned copending application filed in the name of E. T. Corn concurrently herewith and entitled "AUTOMATIC IDENTIFICATION OF GEOMETRIC RELATIONSHIPS BETWEEN ELEMENTS OF A COMPUTER-GENERATED DRAWING" to automatically identify any relevant 2-dimensional constraints between all possible pairs of the thus-constructed or selected elements.

Once the auxiliary foldline and/or other required construction elements have been constructed and the applicable 2-dimensional constraints have been identified, individual elements of the modified composite drawing may be transformed by conventional software while maintaining the geometric relationships specified by the various constraints. As a final step, the construction elements and related constraints may be deleted and the composite drawing transformed into 3 conventional views connected only by conventional projection vectors. Alternatively, the construction elements may be maintained, but hidden from view, and the composite drawing thereafter may be processed as a single 2-dimensional drawing with the constraints maintained for subsequent parametric transformations in a manner that will preserve the identified 3-dimensional constraints.

It should be noted that the foregoing description assumes that all views are to the same scale and that corresponding elements of aligned views are directly opposite each other. If that is not the case, the views should be appropriately re-scaled and translated prior to the creation of the auxiliary foldline and the other constructed elements, and again appropriately re-scaled and translated to their original form after the constrained composite drawing has been transformed.

It will be apparent to those skilled in the art that the foregoing description may be readily generalized to non-orthographic views, including so-called "true views" which are projections onto a plane parallel to a particular surface of interest not orthogonal to any standard orthogonal view, and to constraints between an orthogonal view and a non-orthogonal view. Moreover, although the identified constraints are associated with lines and surfaces parallel to or perpendicular to the projection surfaces of one or more views, it will be apparent that a supplemental view may be readily generated in which any line or surface of interest is parallel or perpendicular to its projection surface.

Moreover, even though the known transformation software only process points, straight lines, and circles, and does not make express provision for certain other types of geometrical elements such as ellipses and conical sections, conventional construction and profile projection techniques may be used to represent the element in question by substitute circular and linear elements which may then be appropriately constrained and transformed in conventional fashion, and the transformed substitute element then subsequently used to construct the required transformed element. For example, an ellipse may be temporarily replaced by a rectangle tangent to points on the major and minor axes of the ellipse, or by a circular cylinder intersected by a surface inclined relative to its axis.

What is claimed is:

1. A method for automatically defining and maintaining geometrical relationships between projected views of a three-dimensional object, said method comprising the computer-implemented steps of:

identifying a first geomtrical element in a first projected view;

identifying a second geometrical element in a second projected view;

if a first projection vector of the first projected view is non-parallel to a second projection vector of the second projected view, constructing a foldline which bisects an angle between the first projection vector and the second projection vector;

generating a first construction line which intersects the foldline and is parallel to the first geometrical element;

generating a second construction line which intersects the foldline and is parallel to the second geometrical element; and repositioning said geometrical element within said second projected view to conform positions of said first geometrical element and said second geometrical element with the first construction line and the second construction line.

2. The method as claimed in claim 1 wherein said first and said second geometrical elements are lines and said established relationship is a coplanarity constraint between said first and said second geometrical elements.

3. The method as claimed in claim 1 wherein said first geometrical element is a point and said second geometrical element is a line and said established relationship is a line on plane constraint between said first and said second geometrical elements.

4. The method as claimed in claim 1 wherein said first geometrical element is a circle and said second geometrical element is a line and said established relationship is a plane-tangent constraint between said first and said second geometrical elements.

5. The method as claimed in claim 1 wherein a projection vector of said first projected view is parallel with a projection vector of said second projected view.

6. The method as claimed in claim 1 wherein said first projected view is offset from said second projected view.

7. The method as claimed in claim 6 further including a step of defining a foldline between said first projected view and said second projected view.

8. A method for automatically defining and maintaining geometrical relationships between projected views of a three-dimensional object, said method comprising the computer-implemented steps of:

identifying a first geometrical element in a first projected view;

determining if a second geometrical element in a second projected view is located in a position corresponding to a position of said first geometrical element in said first-projected view;

if a first projection vector of the projected view is non-parallel to a second projection vector of the second projected view,
constructing a foldline which bisects an angle between the first projection vector and the second projection vector;
generating a first construction line which intersects the foldline and is parallel to the first geometrical element;
generating a second construction line which intersects the foldline and is parallel to the second geometrical element;

modifying said first projected view in response to an edit request; and, responsive to said step of modifying said first projected view, modifying said second projected view to conform positions of said the first geometrical element and the second geometrical element with the first construction line and the second construction line.

9. The method as claimed in claim 8 wherein said first and said second geometrical elements are lines and said established relationship is a coplanarity constraint between said first and said second geometrical elements.

10. The method as claimed in claim 8 wherein said first geometrical element is a point and said second geometrical element is a line and said established relationship is a line on plane constraint between said first and said second geometrical elements.

11. The method as claimed in claim 8 wherein said first geometrical element is a circle and said second geometrical element is a line and said established relationship is a plane-tangent constraint between said first and said second geometrical elements.

12. The method as claimed in claim 8 wherein a projection vector of said first projected view is parallel with a projection vector of said second projected view.

13. The method as claimed in claim 8 wherein said first projected view is offset from said second projected view.

14. The method as claimed in claim 13 further including a step of defining a foldline between said first projected view and said second projected view.

15. The method of claim 8 wherein said step of modifying said second projected view comprises the step of repositioning said second geometric element within said second projected view.

16. The method of claim 8 wherein said step of modifying said second projected view comprises the step of resizing said second geometric element within said second projected view.

17. A method for automatically defining and maintaining geometrical relationships between projected view of a three-dimensional object, said method comprising the computer-implemented steps of:

iteratively obtaining each of a plurality of geometrical elements in a first projected view;

determining if a geometrical element in a second projected view is located in a position corresponding to a position of one of said plurality of geometrical elements in said first projected view;

if a first projection vector of the first projected view is non-parallel to a second projection vector of the second projected view,
constructing a foldline which bisects an angle between the first projection vector and the second projection vector;
generating a first construction line which intersects the foldline and is parallel to a first geometrical element;
generating a second construction line which intersects the foldline and is parallel to a second geometrical element;

modifying said first projected view in response to an edit request; and, responsive to said step of modifying said first projected view, modifying said second projected view to conform positions of said the first geometrical element and the second geometrical element with the first construction line and the second construction line.

18. A computerized apparatus for depicting a three dimensional object as two or more projected views and for automatically defining and maintaining geometrical relationships between said projected views, said apparatus comprising:

means for identifying a first geometrical element in a first projected view;

means for identifying a second geometrical element in a second projected view;

if a first projection vector of the first projected view is non-parallel to a second projection vector of the second projected view,
means for constructing a foldline which bisects an angle between the first projection vector and the second projection vector;
means for generating a first construction line which intersects the foldline and is parallel to the first geometrical element;
means for generating a second construction line which intersects the foldline and is parallel to the second geometrical element;

means for repositioning said second geometrical element within said second projected view to conform positions of said first geometrical element and said second geometrical element with the first construction line and the second construction line.

19. The apparatus as claimed in claim 18 wherein said first and said second geometrical elements are lines and said established relationship is a coplanarity constraint between said first and said second geometrical elements.

20. The apparatus as claimed in claim 18 wherein said first geometrical element is a point and said second geometrical element is a line and said established relationship is a line on plane constraint between said first and said second geometrical elements.

21. The apparatus as claimed in claim 18 wherein said first geometrical element is a circle and said second geometrical element is a line and said established relationship is a plane-tangent constraint between said first and said second geometrical elements.

22. The apparatus as claimed in claim 18 wherein a projection vector of said first projected view is parallel with a projection vector of said second projected view.

23. The apparatus as claimed in claim 18 wherein said first projected view is offset from said second projected view.

24. The apparatus as claimed in claim 23 further including means for defining a foldline between said first projected view and said second projected view.

25. A computerized apparatus for depicting a three dimensional object as two or more projected views and for automatically defining and maintaining geometrical relationships between said projected views, said apparatus comprising:

means for identifying a first geometrical element in a first projected view;

means for determining if a second geometrical element in a second projected view is located in a position corresponding to a position of said first geometrical element in said first projected view; and if a first projection vector of the first projected view is non-parallel to a second projection vector of the second projected view,
  means for constructing a foldline which bisects an angle between the first projection vector and the second projection vector;
  means for generating a first construction line which intersects the foldline and is parallel to the first geometrical element;
  means for generating a second construction line which intersects the foldline and is parallel to the second geometrical element;

means for modifying said first projected view in response to an edit request; and, means for modifying said second projected view to conform positions of said the first geometrical element and the second geometrical element with the first construction line and the second construction line.

26. The apparatus as claimed in claim 25 wherein said first and said second geometrical elements are lines and said established relationship is a coplanarity constraint between said first and said second geometrical elements.

27. The apparatus as claimed in claim 25 wherein said first geometrical element is a point and said second geometrical element is a line and said established relationship is a line on plane constraint between said first and said second geometrical elements.

28. The apparatus as claimed in claim 25 wherein said first geometrical element is a circle and said second geometrical element is a line and said established relationship is a plane-tangent constraint between said first and said second geometrical elements.

29. The apparatus as claimed in claim 25 wherein a projection vector of said first projected view is parallel with a projection vector of said second projected view.

30. The apparatus as claimed in claim 25 wherein said first projected view is offset from said second projected view.

31. The apparatus as claimed in claim 30 further including means for defining a foldline between said first projected view and said second projected view.

32. An article of manufacture comprising a computer usable mass storage medium having computer readable program code embodied therein for causing a processing means to execute computer-implemented program code for depicting a three dimensional object as two or more projected views and for automatically defining and maintaining geometrical relationships between said projected views, said computer readable program code in said article of manufacture comprising:

computer readable program code for causing said processing means to identify a first geometrical element in a first projected view; computer readable program code for causing said processing means to identify a second geometrical element in a second projected view;

if a first projection vector of the first projected view is non-parallel to a second projection vector of the second projected view,
  computer readable program code for causing said processing means to construct a foldline which bisects an angle between the first projection vector and the second projection vector;
  computer readable program code for causing said processing means to generate a first construction line which intersects the foldline and is parallel to the first geometrical element;
  computer readable program code for causing said processing means to generate a second construction line which intersects the foldline and is parallel to the second geometrical element; and computer readable program code for causing said processing means to reposition said second geometrical element within said second projected view to conform positions of said first geometrical element and said second geometrical element with the first construction line and the second construction line.

\* \* \* \* \*